Figure 1:
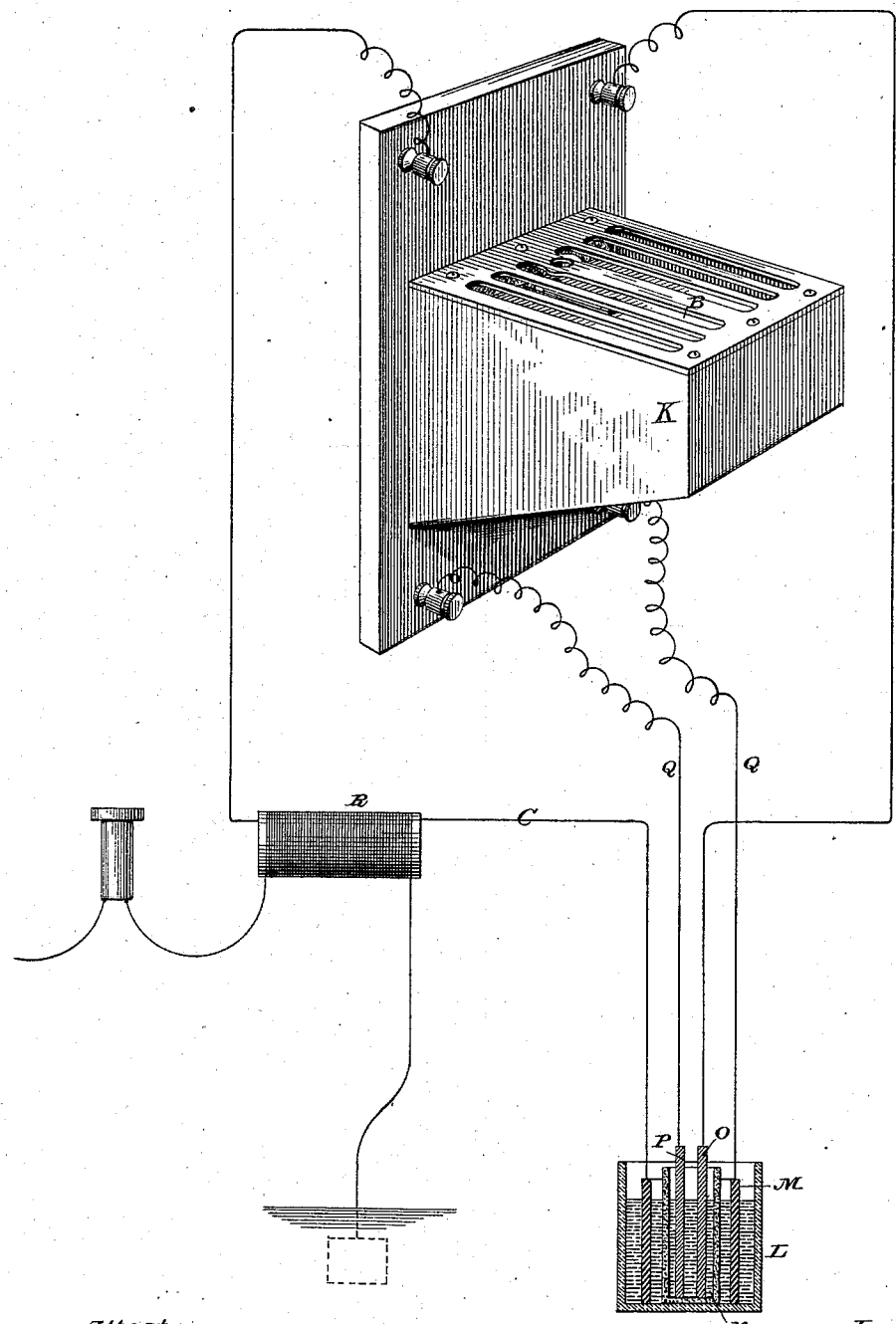

(No Model.) 2 Sheets—Sheet 2.

J. H. IRWIN.
Telephone.

No. 237,188. Patented Feb. 1, 1881.

Attest:
R. F. Barnes
A. B. Smith

Inventor:
John H. Irwin
By his atty
R. D. O. Smith

UNITED STATES PATENT OFFICE.

JOHN H. IRWIN, OF MORTON, PENNSYLVANIA.

TELEPHONE.

SPECIFICATION forming part of Letters Patent No. 237,188, dated February 1, 1881.

Application filed April 24, 1880. (No model.)

*To all whom it may concern:*

Be it known that I, JOHN H. IRWIN, of Morton, Delaware county, Pennsylvania, have invented a new and useful Improvement in Telephones; and I do hereby declare that the same is fully described in the following specification.

To fully illustrate my meaning I will briefly refer to my patents heretofore granted to me. In my patent of October 22, 1878, No. 209,266, the electrodes were maintained in contact by gravity, differentiated by a supporting-spring the tension of which was capable of modification as desired, so that after the proper initial contact had been secured it would not be materially modified by variations of temperature or mechanical vibrations. In practice, however, there are always experienced current variations due to local causes and fluctuations of resistance along the line, and the supporting-spring shown in my patent above mentioned took no note of these current variations. I therefore devised the electro-magnetic regulator patented to me to replace said spring and compensate said current variations. Experience has shown another cause of current variation in the battery itself, due to variations of temperature, strength of solution, &c., and this battery fluctuation, while not sudden and frequent, like the line fluctuations referred to above, is nevertheless the source of trouble, and for its correction requires frequent readjustment of the instrument.

By means of the invention set forth in this specification and in the specification of my patent dated November 16, 1880, No. 234,579, the telephonic transmitter has been practically relieved of all the defective features which have heretofore rendered its use more or less unsatisfactory except in the hands of experts.

This invention therefore relates to a compensation for battery fluctuation, and the principle of its action is found in this statement of facts. With reference to a given current of electricity the resistance of the conductor will be in inverse ratio to its area. I have discovered that in order to effect a uniform operation it is necessary that the area of the resisting conductor shall diminish or increase as the current becomes weak or strong. In telephones the point or place of resistance is at the point of contact between the electrodes, and therefore as the battery becomes weak the electrode contact must become correspondingly weak in order to maintain that relatively uniform resistance upon which uniform performance depends. Conversely, when the battery strengthens the electrode contact must increase. I therefore place an electro-magnet in communication with the movable electrode in such a manner that when the excitement of said magnet increases by an augmentation of battery action said electrodes will be thereby brought into more intimate contact and their resistance diminished; and, conversely, when the battery excitement diminishes the excitement of the magnet will correspondingly diminish and the intimacy of electrode contact will correspondingly relax and resistance increase. The electricity which excites the magnet must not be derived from the battery-connection with the transmitter, but must be derived by a separate connection with the same battery which is in circuit with the transmitter. While this connection may be established in various ways, the way which is altogether preferable is by employing an independent electrode in the battery-cell. If the battery includes several cells, then in the last cell of the series this independent electrode is +, and is immersed in the same cell with the regular electrode. It is then under excitement from the same solution with the other electrode, and will participate in the same variations of excitement.

Having now set forth the nature of my invention, I will particularly describe a practical method of carrying it into effect, without, however, designing to confine myself to the details of structure shown, because said details may be greatly varied without changing the principle of operation which I have endeavored to indicate above.

Figure 2:
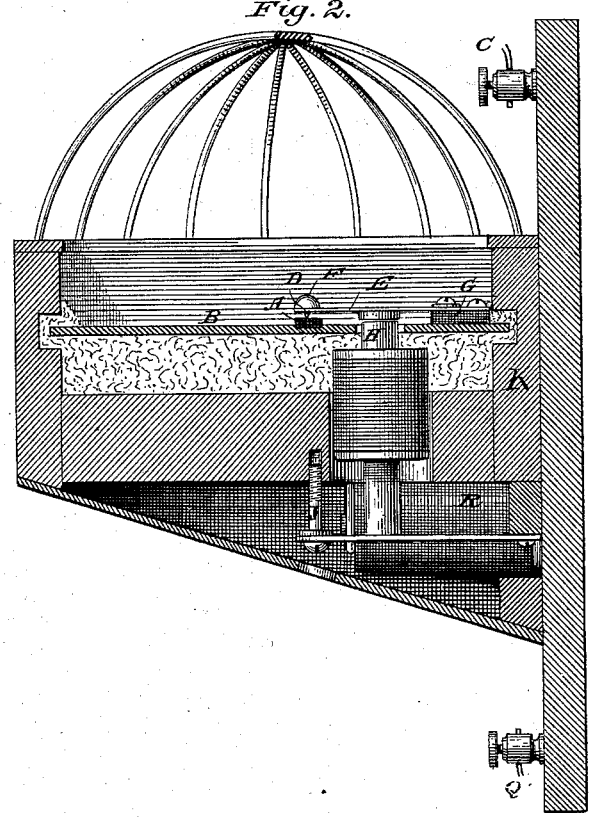
Figure 3:
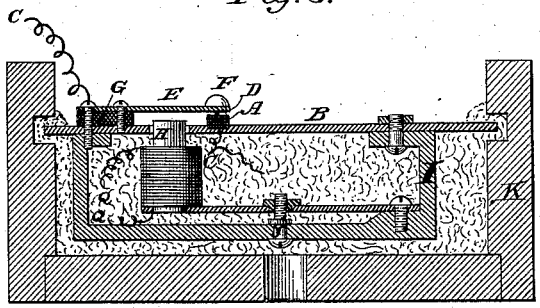
Figure 4:
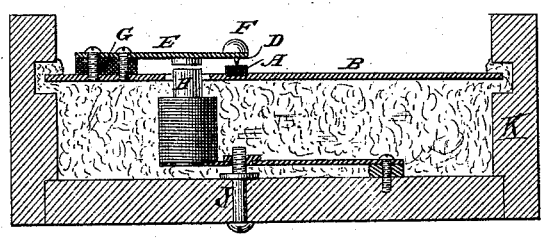

Reference is had to the accompanying drawings, wherein Figure 1 is a perspective view of my instrument with its battery and line connections. Fig. 2 is a sectional elevation of the same. Figs. 3 and 4 are longitudinal sections, showing modified methods of structure.

A is the fixed electrode of the transmitter, rigidly attached to the vibrating diaphragm or receiver of sound-waves B, and C is the circuit-wire. The diaphragm B is preferably made of wood, as described in the specification of my Patent No. 234,579, above referred to, and supported upon a mass of some suitable material. D is the movable electrode, mounted upon the end of a flexible reed, E, which may be of material capable of magnetism, or may be provided with an armature which is so capable. The reed E may be so elastic and mounted that its elasticity will tend to lift the electrodes out of contact, and this elastic force may be differentiated by means of a superadded weight, F. The fixed end of the reed E is mounted upon a block of elastic india-rubber, G, and secured to the diaphragm B by bolts or screws, which are capable of being tightened up, as required, to produce the proper contact adjustment at A D.

The electrode D may be put in circuit $c$ through communication with the reed, or independently thereof, as may be required.

H is the regulating electro-magnet, which I prefer to mount in a bracket, I, attached to the under side of the diaphragm B, because when attached to said diaphragm no displacement thereof will displace the magnet with reference to the electrode D.

J is the regulator-screw, by means of which the magnet H may be moved up or down to properly adjust the armature in the magnetic field, and thereby regulate its attractive force to produce the desired contact at A D.

K is the surrounding case of the instrument.

L is the battery-cell, and M is the electrode or zinc.

N is the porous cell, and O P are the two + or carbon electrodes, both immersed in the solution of the porous cell, but insulated as to each other.

C C are the transmitter circuit-wires, and Q Q are the independent circuit-wires to the electro-magnet H.

The battery shown is an ordinary form and well known; and it is manifest the independent electrode P may be applied to any other form of battery without further invention or contrivance.

R is the ordinary induction-coil, commonly used with a permanent magnet-receiver included in its circuit when the transmitter is short-circuited with the battery.

In this specification and in the drawings attached hereto I have exhibited a transmitter embracing these features: first, a "planchette" to receive the sound-waves, mounted on a bed of some elastic fibrous substance and isolated thereby from the frame-work of the instrument; second, a gravity-electrode, whereof the gravity is differentiated by an electric body; third, a diaphragm whereon both the electrodes are mounted and supported; but I do not include either of said features in the claims hereof, because they are specifically set forth in another specification filed in the Patent Office April 24, A. D. 1880.

Having described my invention, what I claim as new is—

1. A battery provided with two independent electrodes insulated from each other, but excited by the same solution, for the purpose of taking out of the same battery two independent currents, whereby a regulator in the battery independent of the transmitter-current may be operated to compensate the effect of fluctuations of electro-motive force, substantially as set forth.

2. In a telephone, variable resisting-electrodes combined with an electro-magnet, applied and adjusted to regulate independent of the transmitter-current the electrode-resistance with a variability corresponding to the fluctuations of electro-motive force in the battery.

3. In combination, the movable electrode D and regulating electro-magnet H and the battery having independent + electrodes, as set forth.

4. The combination of the movable electrode D and the regulating electro-magnet H, suspended in a bracket, I, attached to the under side of the diaphragm B.

5. The movable electrode D, combined with the regulating electro-magnet H, both mounted in attachments secured to the diaphragm B, substantially as set forth.

J. H. IRWIN.

Witnesses:
R. D. O. SMITH,
KINGSTON GODDARD.